Figure 1:
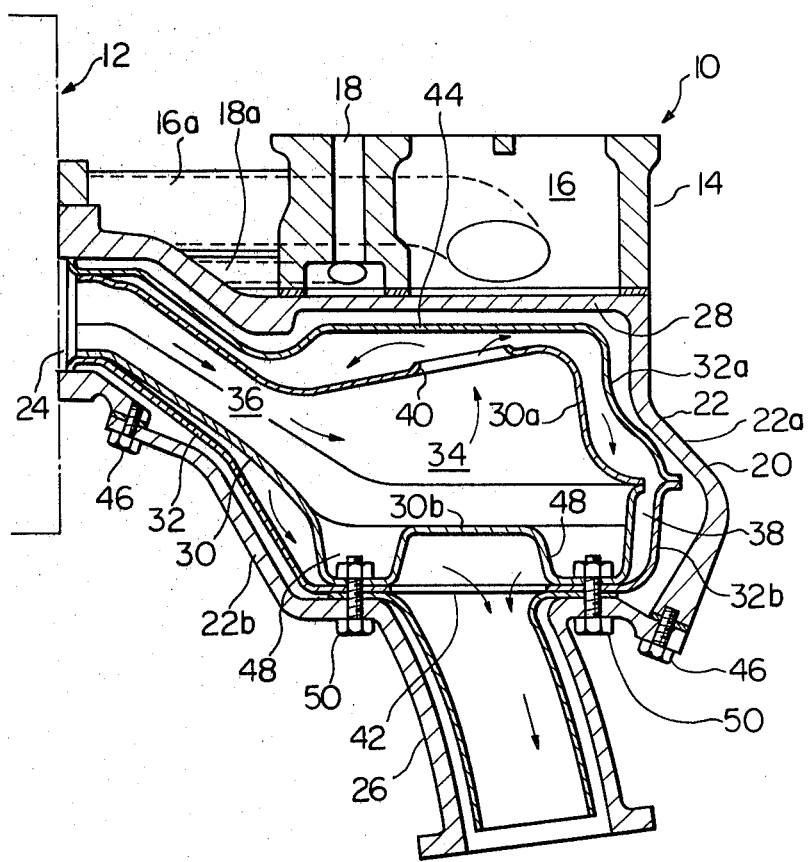

United States Patent [19]
Iwasa

[11] 4,089,164
[45] May 16, 1978

[54] MANIFOLD SYSTEM

[75] Inventor: Yoshio Iwasa, Nagareyama, Japan

[73] Assignee: Nissan Motor Company, Limited, Japan

[21] Appl. No.: 683,489

[22] Filed: May 5, 1976

[30] Foreign Application Priority Data
May 16, 1975 Japan .................................. 50-58417
May 16, 1975 Japan .................................. 50-58418

[51] Int. Cl.² ............................................. F01N 3/10
[52] U.S. Cl. ............................. 60/282; 123/122 AC
[58] Field of Search ......... 60/282; 123/122 R, 122 A, 123/122 AC, 122 AB

[56] References Cited
U.S. PATENT DOCUMENTS

| 3,302,394 | 2/1967 | Pahnke | 60/282 |
| 3,916,850 | 11/1975 | Date | 123/122 R |
| 3,964,460 | 6/1976 | Nakano | 123/122 R |
| 3,994,271 | 11/1976 | Ishizuya | 123/123 AB |

Primary Examiner—Douglas Hart

[57] ABSTRACT

A manifold system for a multi-cylinder internal combustion engine. The manifold system includes intake and exhaust manifolds having a common wall forming the bottom of a heat riser. Within the exhaust manifold dual walled liner construction is installed to provide a reaction chamber jacketed by a fluid jacket in a manner that gas discharged from the reaction chamber is directed toward a heater wall disposed adjacent the common wall and then flows through the jacket chamber. The jacket chamber conveys the gas out of the exhaust manifold to an exhaust pipe.

1 Claim, 2 Drawing Figures

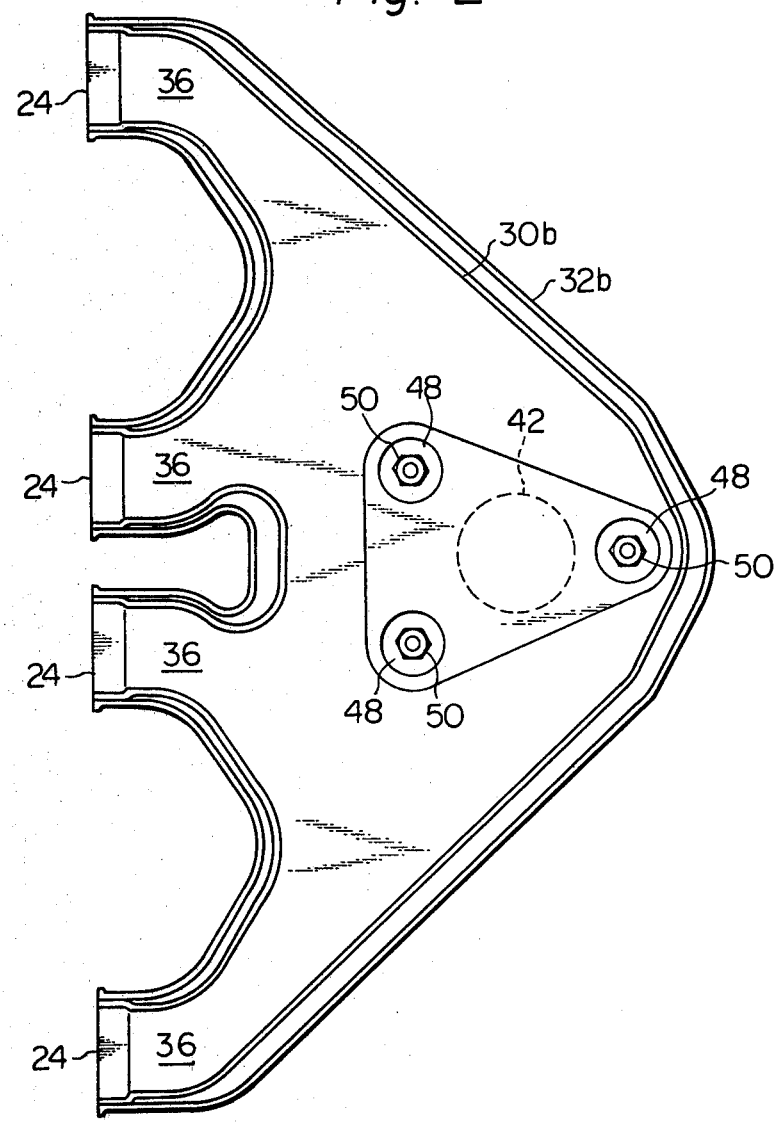

MANIFOLD SYSTEM

The present invention relates to a manifold system for a multi-cylinder internal combustion engine and more particularly to a manifold system for a multi-cylinder internal combustion engine of the type including an auxiliary combustion chamber associated with each main combustion chamber and connected by a torch flame passage.

In operating an internal combustion engine of the type including an auxiliary combustion chamber connected to each main combustion chamber by a torch flame passage, it is necessary to sufficiently vaporize a relatively rich air-fuel mixture before it reaches each auxiliary combustion chamber to provide a stable torch flame, and a relatively lean air-fuel mixture to be supplied to each main combustion chamber. The total air fuel ratio of the mixtures shall be adjusted to a leaner side of the stoichiometry to cause good combustion to take place in each main combustion chamber. The exhaust gas resulted from the combustion in the engine shall be maintained at elevated temperature in an exhaust system to promote self-oxidation of unburned contents before it is discharged to the atmosphere.

In a conventional manifold system, the exhaust gas is directed toward and in contact with the bottoms of auxiliary and main manifold risers to heat the riser bottoms in order to promote vaporization of the rich and lean mixtures. This manifold system has a shortcoming that as a great amount of heat is transferred from the exhaust gas to the mixtures through direct contact of the manifold riser with the exhaust gas, temperature of the exhaust gas in the exhaust manifold reduces to a value at which the self-oxidation of the exhaust gas will not occur, thus deteriorating exhaust emissions.

A main object, therefore, is to provide a manifold system by which the exhaust gas is maintained high and long enough for efficient oxidation of unburned contents and the combustible mixtures to be supplied to the engine is sufficiently heated with the exhaust gas.

Another object of the present invention is to provide a manifold system of the above character which is simple in construction, easy to assemble, and suitable for mass production.

Still another object of the present invention is to provide an exhaust manifold of a manifold system of the above character which acts as a lean reactor.

These objects, features and advantages of the present invention will become apparent from the following description in connection with the accompanying drawings, in which:

FIG. 1 is a sectional view of a manifold system according to the present invention, the manifold system being connected to an internal combustion engine of the type including an auxiliary combustion chamber associated with each main combustion chamber and connected by a torch flame passage, the former having a spark plug to ignite a rich mixture in the auxiliary combustion chamber to ignite a lean mixture in the main combustion chamber.

FIG. 2 is a sub-assembly of a part of an inner liner and a part of an outer liner.

Referring to FIG. 1 of the drawings, there is illustrated a manifold system 10 for an internal combustion engine 12 which includes a main combustion chamber and an auxiliary combustion chamber in which combustion is effected and a combustion flame rushes into the main combustion chamber by way of a torch flame passage. The manifold system 10 comprises an intake manifold 14 having a main heat riser 16, from which a plurality of main manifold passages 16a extend toward cylinders of the engine 12 to distribute a lean fuel-air mixture from a main carburetor (not shown) to the main combustion chambers. The intake manifold 14 has an auxiliary heat riser 18, from which a plurality of auxiliary manifold passages 18a extend toward the cylinders to distribute a rich fuel-air mixture from an auxiliary carburetor (not shown) to the auxiliary combustion chambers. An exhaust manifold 20 has a casing 22 having a plurality of inlet ports, only one being shown in FIG. 1 at 24, each being connected to at least one of the cylinders of the engine 12. The exhaust manifold 20 has an outlet port 26. The casing 22 and intake manifold 14 have a common wall 28 which forms the bottom of the main and auxiliary heat risers 16 and 18. Mounted within the casing 22 are inner and outer liners 30 and 32. The inner liner 30 has a reaction chamber 34 and a plurality of passages 36, corresponding in number to the plurality of inlet ports 24 (see FIG. 2), extending outwardly from the reaction chamber 34 toward the inlet ports 24 to receive the exhaust gas. The inner liner 30 is jacketed by the outer liner 32. The outer liner 32 is spaced from the inner liner 30 to form around the reaction chamber 34 a fluid jacket chamber 38 which is in communication with the reaction chamber 34 through a discharge port 40 and with the outlet port 26 through an aperture 42. The outer liner 32 has a heater wall 44 which is exposed to the fluid jacket chamber 38 and extends in spaced and opposite relation to the common wall 28 so that the common wall 28 is exposed to heat radiated from the heater wall 44.

The discharge port 40 is disposed adjacent to the heater wall 44 to direct the hot gas resulted from oxidation reaction in the reaction chamber 34 toward the heater wall 44. The aperture 42 is positioned in alignment with the outlet port 26 and arranged with respect to the discharge port 40 such that the gas from the reaction chamber 34 covers substantially all outer surface area of the reaction chamber 34 before it flows out of the fluid jacket chamber 38 through the aperture 42.

The plurality of passages 36 extend upwardly from the reaction chamber 34 so that the exhaust gas alters its direction in the reaction chamber 34 (see solid arrows) to lengthen flow path of the exhaust gas till the discharge port 40.

It is to be noted that amount of heat transfer from the exhaust gas toward the casing 22 before the gas reaches the reaction chamber 34 is reduced so that the temperature of the exhaust gas will be maintained sufficiently high enough to oxidize unburned contents in the reaction chamber 34 because the inner liner 30 jacketed by the outer liner 32 prevents the exhaust gas from contacting the casing 22. It is also to be noted that the heater wall 44 is heated by the gas resulted from oxidation of unburned contents of the exhaust gas within the reaction chamber 34 and the gas cooled due to heat transfer to the heater wall 44 will not flow back to the stream of gas entering the reaction chamber 34.

For the ease of assembly, the casing 22 is divided into a first part 22a including the common wall 28 and a second part 22b including the outlet port 26. The first and second parts 22a and 22b are secured to each other by a plurality of screws 46 (see FIG. 1). The inner liner 30 is divided into a first part 30a including the discharge port 40 and a second part 30b. The second part 30b has at least three lege portions 48. The first and second parts 30a and 30b are secured to each other by weld. The outer liner 32 is divided into a first part 32a including the heater wall 14 and a second part 32b including the aperture 42. The first and second parts 32a and 32b are secured to each other by weld.

In assembly, the plurality of leg portions 48 of the second part 30b of the inner liner 30, an edge portion of the second part 32b of the outer liner 32 around the aperture 42 are adequetely positioned on an edge portion of the second part 22b around the outlet port 26 by interposing the edge portion of around the aperture 42 and they are fastened to the second part 22b of the casing 22 by a plurality of mechanical fasteners 50, each consisting of a bolt and nut (see FIG. 2). The first part 30a is welded to the corresponding second part 30b to form the inner liner 30. The first part 32a is welded to the second part 32 to form the outer liner 32. Finally, the first part 22a is secured by the screws 46 to the second part 22b of the subassembly of the inner and outer liners 30 and 32 and the second part 22b to form the final assembly (see FIG. 1).

What is claimed is:

1. A manifold system for a multi-cylinder, internal combustion engine having a plurality of cylinders, said manifold system comprising:

an intake manifold system connectable to said plurality of cylinders to distribute an air-fuel mixture thereinto, said intake manifold system having a heat riser; and an exhaust manifold system including a casing having a section forming the bottom of said heat riser, said casing having a plurality of inlet ports connectable to said plurality of cylinders to receive the exhaust gases, and an outlet port;

an inner liner mounted within said casing, said inner liner having a reaction chamber and a plurality of passages corresponding in number to said plurality of inlet ports, said passages leading from said plurality of inlet ports of said casing to said reaction chamber to direct all of the exhaust gases toward said reaction chamber; and an outer liner mounted within said casing to jacket said inner liner, said outer liner having a jacket chamber enclosing said reaction chamber and a plurality of jacket tubes enclosing said plurality of passages of said inner liner, respectively, said plurality of jacket tubes extending outwardly from said jacket chamber to said inlet ports of said casing and being connected to said inner liner at said inlet ports of said casing, said outer liner having a heater wall which forms part of said jacket chamber and extends in spaced and opposite relation to said section of said casing so that the bottom of said heat riser is exposed to heat from said heater wall;

said inner liner being designed to direct all of the gases resulting from the reaction within said reaction chamber toward said heater wall upon discharge from said reaction chamber, said outer liner having an aperture positioned in alignment with said outlet port of said casing, said outer liner being designed to direct all of the gases resulting from the reaction within said reaction chamber to flow through said jacket chamber toward said outlet port of said casing so that the gases flowing through said jacket chamber cover substantially all outer surface area of said reaction chamber before they flow out of said jacket chamber through said outlet port of said casing, in which said casing is divided into a first part including said section forming the bottom of said heat riser and a second part including said outlet port; in which said inner liner is divided into a first part including a discharge port which directs all of the gases resulting from the reaction within said reaction chamber toward said heater wall and a second part including a plurality of leg portions; and in which said outer liner is divided into a first part including said heater wall and a second part including said aperture;

said second parts of said casing, said inner liner, and said outer liner being assembled with each other by interposing an edge portion of said second part of said outer liner around said aperture between said plurality of leg portions and an edge portion of said second part of said casing around said outlet port.

* * * * *